J. Lamburn. Clover Harvester.

No. 119,369. Patented Sep. 26, 1871.

Witnesses:
P. C. Dieterich
Gustave Dieterich

Inventor:
J. Lamburn
per
Attorneys.

119,369

UNITED STATES PATENT OFFICE.

JONATHAN LAMBURN, OF BOUNDARY CITY, INDIANA.

IMPROVEMENT IN CLOVER-HARVESTERS.

Specification forming part of Letters Patent No. 119,369, dated September 26, 1871.

*To all whom it may concern:*

Be it known that I, JONATHAN LAMBURN, of Boundary City, in the county of Jay and State of Indiana, have invented a new and useful Improvement in Clover-Harvester; and I do hereby declare that the following is a full, clear, and exact description thereof, which will enable others skilled in the art to make and use the same, reference being had to the accompanying drawing forming part of this specification.

My invention consists in an improvement upon the usual method of adjusting the comb of seed-harvesters, as hereinafter fully described and subsequently pointed out in the claim.

Figure 1:
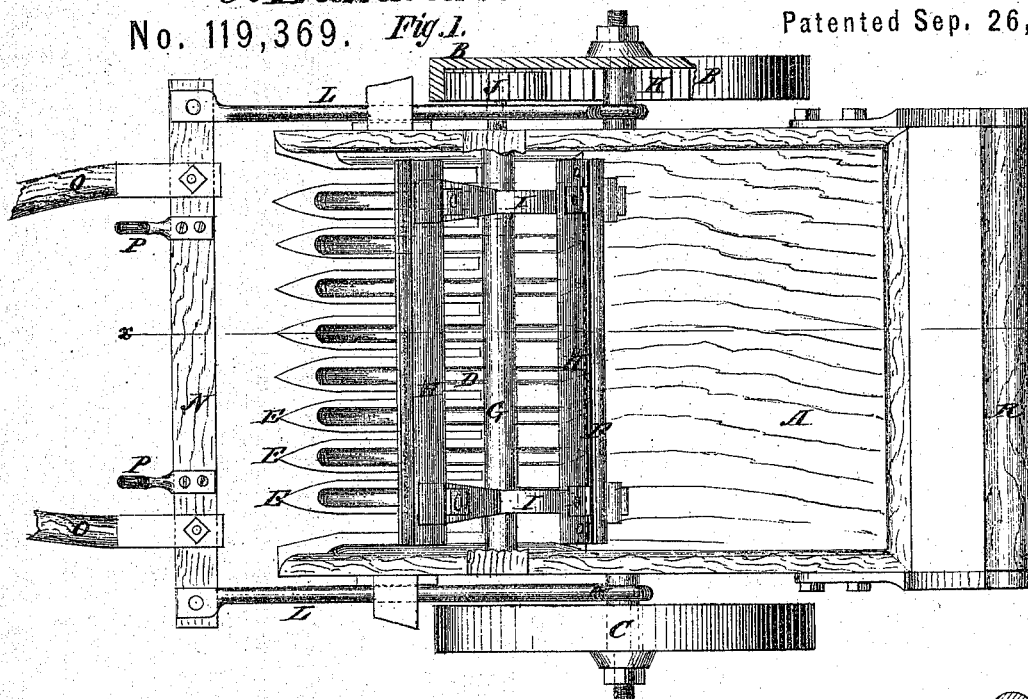
Figure 2:
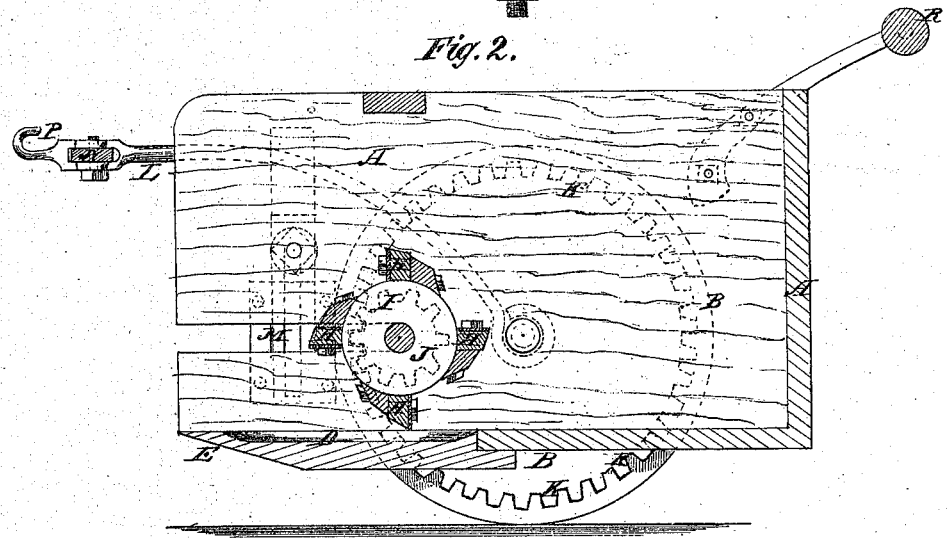
Figure 3:
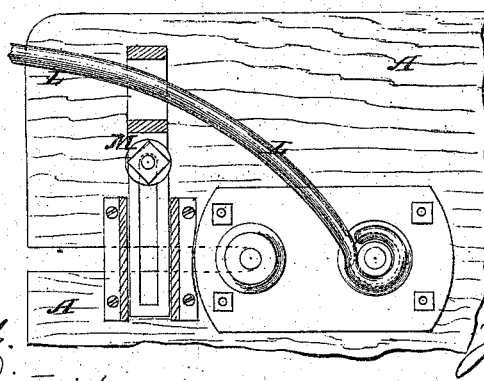

In the accompanying drawing, Figure 1 represents a top or plan view of the machine. Fig. 2 is a vertical longitudinal section of Fig. 1 taken on the line $x$ $x$. Fig. 3 is a sectional side view, showing the arrangement of the curved draft-rods and the reel-bearings.

Similar letters of reference indicate corresponding parts.

A is the box or body supported on the axle of the wheels B and C. D is the comb, consisting of teeth E, attached to the front end of the bottom of the body A at a sufficient distance apart to receive the clover-stalks between them and to strip off the heads of the clover as the machine moves forward. The top sides of the teeth are hollowed out or made concave, as seen in Fig. 1, so as to make sharper edges and more readily conduct the heads back into the box. F is the reel, consisting of a shaft, G, which passes through the sides of the box A, with wings H supported by the arms I. This reel is arranged directly above the back ends of the teeth, and the wings sweep so as to just clear the teeth and force the heads of clover back into the box. As seen in Fig. 1, the wheel B has an internal gear-wheel, K, attached to its inner side. One end of the reel-shaft projects through the box, and has a pinion, J, thereon, which engages with the internal gear K. As the machine moves forward the reel is revolved, as above described. L L represent the draft-rods, which are attached at one end to the axle outside the box A, and, curving upward, they pass through the adjustable slides M on the sides of the box, and are connected together at their front ends by the draft-bar N. O O are the thills, and P P the draft-hooks. The comb D is adjusted to suit clover of different heights from the ground by means of the slides M, thus changing the line of draft and varying the distance of the ends of the teeth from the ground. R is the handle or bar at the back end of the box, by which the driver guides and regulates the machine.

It will be perceived that the slides M have openings at the top, through which the thill-rods pass, and that these openings are sufficiently long to admit of any vertical adjustment required for the box and comb without bearing upon the rods themselves.

Having thus described my invention, I claim as new and desire to secure by Letters Patent—

The draft-rods L L, attached at one end to the axle and at the other to the thill-bar N, and the adjustable slides M M having elongated openings through which said rods pass and are allowed a slight vertical play, combined with the box A, as and for the purpose specified.

JONATHAN LAMBURN.

Witnesses:
JACOB GARINGER,
JONAS M. LAMBURN. (47)